US008593482B2

(12) United States Patent
Furui

(10) Patent No.: US 8,593,482 B2
(45) Date of Patent: Nov. 26, 2013

(54) PROJECTOR AND METHOD THAT PERFORMS A BRIGHTNESS ADJUSTMENT AND A COLOR ADJUSTMENT

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 77 days.

(21) Appl. No.: 12/950,498

(22) Filed: Nov. 19, 2010

(65) Prior Publication Data

US 2011/0063518 A1 Mar. 17, 2011

Related U.S. Application Data

(63) Continuation of application No. 11/798,891, filed on May 17, 2007.

(30) Foreign Application Priority Data

May 24, 2006 (JP) .................................. 2006-143928

(51) Int. Cl.
*G09G 5/02* (2006.01)
*G09G 5/00* (2006.01)

(52) U.S. Cl.
USPC ............ 345/601; 345/581; 345/589; 345/604

(58) Field of Classification Search
USPC .................................. 345/581, 589, 601, 604
See application file for complete search history.

(56) References Cited

U.S. PATENT DOCUMENTS

| 5,917,462 | A | 6/1999 | Suzuki et al. |
| 6,540,365 | B1 | 4/2003 | Fujiwara et al. |
| 6,592,228 | B1 | 7/2003 | Kawashima et al. |
| 6,932,481 | B2 | 8/2005 | Koyama et al. |
| 7,003,172 | B2 | 2/2006 | Takeuchi et al. |
| 7,164,428 | B2 | 1/2007 | Wada et al. |
| 7,227,990 | B2 | 6/2007 | Hirao |
| 7,278,746 | B2 | 10/2007 | Matthys et al. |
| 2001/0013843 | A1 | 8/2001 | Fujiwara et al. |
| 2001/0019358 | A1 | 9/2001 | Waki et al. |
| 2003/0234785 | A1 | 12/2003 | Matsuda et al. |
| 2004/0046767 | A1 | 3/2004 | Cloutier |
| 2004/0120576 | A1 | 6/2004 | Kim |
| 2004/0131371 | A1* | 7/2004 | Itagaki et al. .................. 399/49 |
| 2004/0140982 | A1 | 7/2004 | Pate |
| 2005/0078227 | A1 | 4/2005 | Kobayashi et al. |
| 2005/0099431 | A1* | 5/2005 | Herbert et al. ................ 345/601 |
| 2005/0253866 | A1 | 11/2005 | Kim et al. |

(Continued)

FOREIGN PATENT DOCUMENTS

| JP | A-09-325412 | 12/1997 |
| JP | A-10-090645 | 4/1998 |
| JP | A-2002-245446 | 8/2002 |
| JP | A-2003-032580 | 1/2003 |

(Continued)

*Primary Examiner* — Jeffrey Chow
(74) *Attorney, Agent, or Firm* — Oliff & Berridge, PLC

(57) ABSTRACT

A projector including: an adjustment image generation section which generates an adjustment image which allows adjustments of brightness and color difference; an input section to which operation information is input; an adjustment information generation section which generates brightness adjustment information indicating an adjustment value of the brightness and color difference adjustment information indicating an adjustment value of the color difference based on the operation information; and an adjustment section which adjusts the brightness and color of an image based on the brightness adjustment information and the color difference adjustment information.

7 Claims, 5 Drawing Sheets

(56) References Cited

U.S. PATENT DOCUMENTS

| | | |
|---|---|---|
| 2005/0270499 A1 | 12/2005 | Ishii et al. |
| 2005/0283344 A1 | 12/2005 | Moscovitch |
| 2006/0132867 A1 | 6/2006 | Sugiyama et al. |
| 2007/0008344 A1* | 1/2007 | Medina .................. 345/647 |
| 2007/0091201 A1 | 4/2007 | Sasaki |

FOREIGN PATENT DOCUMENTS

| | | |
|---|---|---|
| JP | A-2004-23177 | 1/2004 |
| JP | A-2004-80120 | 3/2004 |
| JP | A-2005-283838 | 10/2005 |
| WO | WO 2004/111989 A1 | 12/2004 |

* cited by examiner

FIG.5

| PARAMETER NAME | MEANING | INITIAL VALUE | MINIMUM VALUE | MAXIMUM VALUE |
|---|---|---|---|---|
| L1 | BLACK-WHITE COMPONENT OF GRAYSCALE 1 | 0 | 0 | 50 |
| L2 | BLACK-WHITE COMPONENT OF GRAYSCALE 2 | 0 | -50 | 50 |
| L3 | BLACK-WHITE COMPONENT OF GRAYSCALE 3 | 0 | -50 | 50 |
| L4 | BLACK-WHITE COMPONENT OF GRAYSCALE 4 | 0 | -50 | 50 |
| L5 | BLACK-WHITE COMPONENT OF GRAYSCALE 5 | 0 | -50 | 0 |
| U1 | BLUE-YELLOW COMPONENT OF GRAYSCALE 1 | 0 | -50 | 50 |
| U2 | BLUE-YELLOW COMPONENT OF GRAYSCALE 2 | 0 | -50 | 50 |
| U3 | BLUE-YELLOW COMPONENT OF GRAYSCALE 3 | 0 | -50 | 50 |
| U4 | BLUE-YELLOW COMPONENT OF GRAYSCALE 4 | 0 | -50 | 50 |
| U5 | BLUE-YELLOW COMPONENT OF GRAYSCALE 5 | 0 | -50 | 50 |
| V1 | GREEN-RED COMPONENT OF GRAYSCALE 1 | 0 | -50 | 50 |
| V2 | GREEN-RED COMPONENT OF GRAYSCALE 2 | 0 | -50 | 50 |
| V3 | GREEN-RED COMPONENT OF GRAYSCALE 3 | 0 | -50 | 50 |
| V4 | GREEN-RED COMPONENT OF GRAYSCALE 4 | 0 | -50 | 50 |
| V5 | GREEN-RED COMPONENT OF GRAYSCALE 5 | 0 | -50 | 50 |

PROJECTOR AND METHOD THAT PERFORMS A BRIGHTNESS ADJUSTMENT AND A COLOR ADJUSTMENT

This is a Continuation of application Ser, No. 11/798,891 filed May 17, 2007, which claims priority to Japanese Patent Application No. 2006-143928, filed on May 24, 2006. The disclosure of the prior applications is hereby incorporated by reference in its entirety.

BACKGROUND OF THE INVENTION

The present invention relates to a projection device, an image display system, an information storage medium, and an image processing method.

When projecting images using multiple projectors, the viewer of the images is given a wrong impression if the respective images differ in brightness and color. In this case, it is necessary to adjust each projector so that the respective images have the same brightness and color.

For example, JP-A-10-90645 discloses a method of projecting images using two or more liquid crystal projectors, detecting the luminance of light projected from each liquid crystal projector using a luminance sensor, and correcting the luminance of light projected from each liquid crystal projector based on the difference between the luminance of a reference projector and the lowest luminance.

A method of allowing the user to adjust projectors has also been proposed in addition to the method of using a sensor as disclosed in JP-A-10-90645.

For example, JP-A-2005-283838 discloses an image processing device which displays an adjustment image for the user to adjust the grayscale, hue, or saturation parameter, adjusts a look-up table based on the adjustment value of each parameter set by the user, and corrects the color of image data using the look-up table.

FIGS. 5 to 7 of JP-A-2005-283838 disclose a method of separately adjusting the grayscale, hue, and saturation in units of colors such as R, G, B, C, M, and Y.

According to the method of using a sensor as disclosed in JP-A-10-90645, it is difficult to adjust the brightness and the color of an image in conformity with the user's preference.

According to the manual adjustment method as disclosed in JP-A-2005-283838, when changing the hue of G, the grayscale (brightness) is also changed in addition to the hue. Therefore, it is difficult to change only the hue without changing the brightness.

It is also difficult to adjust only the brightness without changing the hue. For example, an ordinary user is not aware that R, G, and B must be adjusted in the same amount in order to adjust only the brightness without changing the hue. Therefore, it is difficult for the user to adjust an image so that the image has the brightness and the color in conformity with the user's preference using the method of adjusting an image in color units as disclosed in JP-A-2005-283838. In particular, when projecting images using multiple projectors, the user takes time to adjust the image from each projector so that the image has the brightness and the color in conformity with the user's preference.

SUMMARY

According to a first aspect of the invention, there is provided a projection device comprising:

an adjustment image generation section which generates an adjustment image which allows adjustments of brightness and color difference;

an input section to which operation information is input;

an adjustment information generation section which generates brightness adjustment information indicating an adjustment value of the brightness and color difference adjustment information indicating an adjustment value of the color difference based on the operation information; and an adjustment section which adjusts the brightness and color of an image based on the brightness adjustment information and the color difference adjustment information.

According to a second aspect of the invention, there is provided an image display system projecting images in parallel by using a plurality of the above-described projection devices.

According to a third aspect of the invention, there is provided an information storage medium storing a program causing a computer included in a projection device to function as:

an adjustment image generation section which generates an adjustment image which allows adjustments of brightness and color difference;

an input section to which operation information is input;

an adjustment information generation section which generates brightness adjustment information indicating an adjustment value of the brightness and color difference adjustment information indicating an adjustment value of the color difference based on the operation information; and an adjustment section which adjusts the brightness and color of an image based on the brightness adjustment information and the color difference adjustment information.

According to a fourth aspect of the invention, there is provided an image processing method comprising causing a projection device to generate an adjustment image which allows adjustments of brightness and color difference, receive operation information, generate brightness adjustment information indicating an adjustment value of the brightness and color difference adjustment information indicating an adjustment value of the color difference based on the operation information, and adjust the brightness and color of an image based on the brightness adjustment information and the color difference adjustment information.

BRIEF DESCRIPTION OF THE SEVERAL VIEWS OF THE DRAWING

FIG. 5 is a table showing adjustment parameters according to one embodiment of the invention.

DETAILED DESCRIPTION OF THE EMBODIMENT

Figure 1:
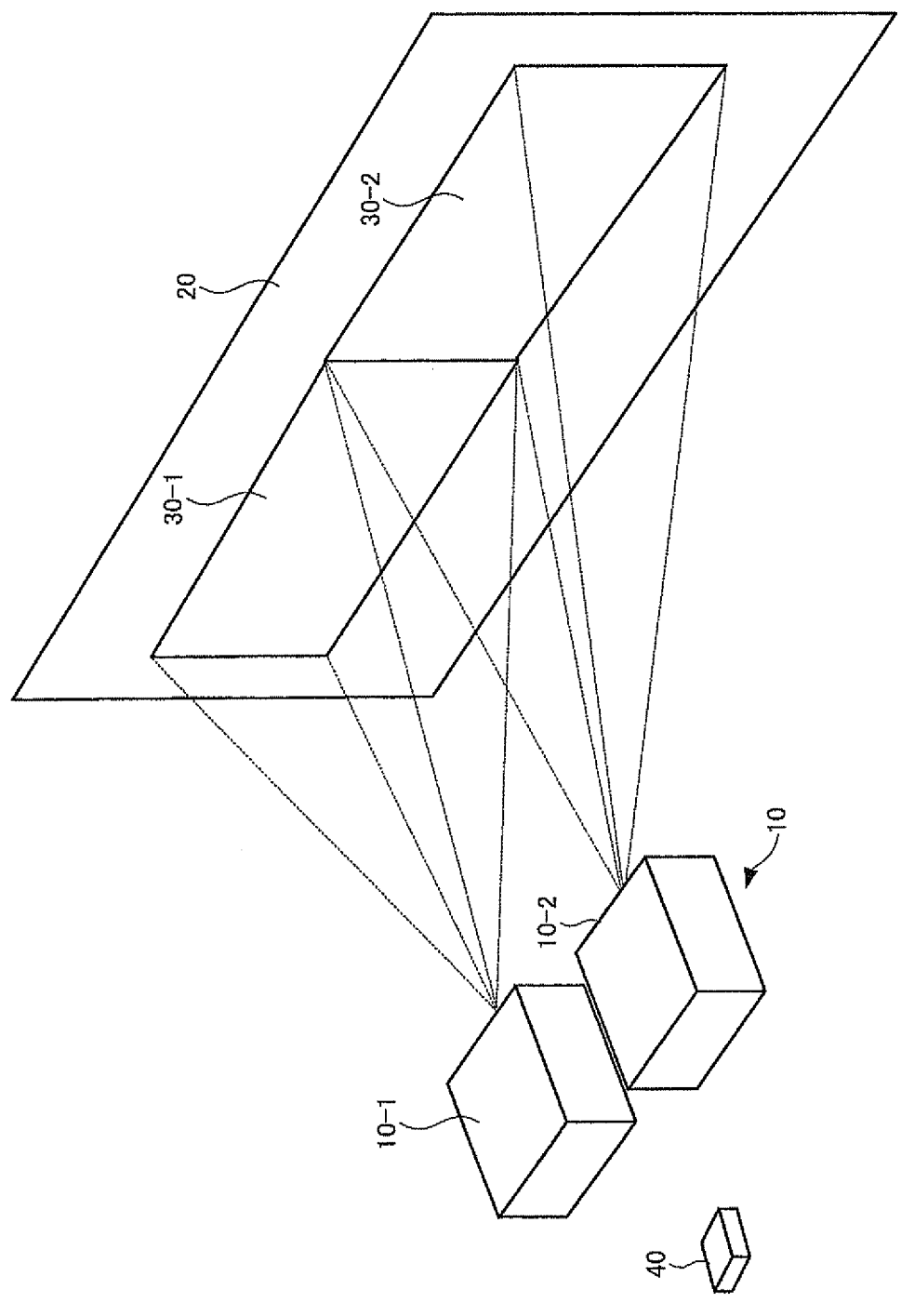
FIG. 1 is a view showing an image display state according to one embodiment of the invention.

The invention may provide a projection device, an image display system, an information storage medium, and an image processing method capable of allowing a user to more appropriately adjust an image in a shorter period of time so that the image has the brightness and the color in conformity with the user's preference.

According to one embodiment of the invention, there is provided a projection device comprising:

an adjustment image generation section which generates an adjustment image which allows adjustments of brightness and color difference;

an input section to which operation information is input;

an adjustment information generation section which generates brightness adjustment information indicating an adjustment value of the brightness and color difference adjustment information indicating an adjustment value of the color difference based on the operation information; and an adjustment section which adjusts the brightness and color of an image based on the brightness adjustment information and the color difference adjustment information.

According to one embodiment of the invention, there is provided an image display system projecting images in parallel by using a plurality of the above-described projection devices.

According to one embodiment of the invention, there is provided an information storage medium storing a program causing a computer included in a projection device to function as:

an adjustment image generation section which generates an adjustment image which allows adjustments of brightness and color difference;

an input section to which operation information is input;

an adjustment information generation section which generates brightness adjustment information indicating an adjustment value of the brightness and color difference adjustment information indicating an adjustment value of the color difference based on the operation information; and an adjustment section which adjusts the brightness and color of an image based on the brightness adjustment information and the color difference adjustment information.

According to one embodiment of the invention, there is provided an image processing method comprising causing a projection device to generate an adjustment image which allows adjustments of brightness and color difference, receive operation information, generate brightness adjustment information indicating an adjustment value of the brightness and color difference adjustment information indicating an adjustment value of the color difference based on the operation information, and adjust the brightness and color of an image based on the brightness adjustment information and the color difference adjustment information.

According to the above embodiments, the projection device and the like can adjust the brightness and the color of an image in response to brightness and color difference adjustment instructions. This enables the user to appropriately adjust an image in a shorter period of time so that the image has the brightness and the color in conformity with the user's preference.

The projection device may further comprise a projection section which projects a composite image obtained by superimposing the adjustment image on a calibration image, wherein the projection section may project the composite image adjusted by the adjustment section when the adjustment section has made adjustments.

When the projection device projects a composite image obtained by superimposing the adjustment image on a calibration image, the projection device may project the composite image of which the brightness and color have been adjusted based on the brightness adjustment information and the color difference adjustment information.

According to this configuration, since the user can adjust an image while watching the projected calibration image, the user can appropriately adjust the image in a shorter period of time so that the image has the brightness and the color in conformity with the user's preference.

The projection device may further comprise:

a calibration image generation section which generates a plurality of calibration images having different grayscales, wherein the adjustment image generation section may generate an image which allows selection of the grayscales of the calibration images as part of the adjustment image;

wherein the input section may input information of the selected grayscales;

wherein the calibration image generation section may generate the calibration images corresponding to the selected grayscales based on the information of the selected grayscales; and wherein the projection device may project composite images obtained by superimposing the adjustment image and the calibration images corresponding to the selected grayscales.

The projection device may generate an image which allows selection of a grayscale of the calibration image as part of the adjustment image, receive information of the selected grayscale, generate the calibration image corresponding to the selected grayscale based on the information of the selected grayscale, and project a composite image obtained by superimposing the adjustment image and the calibration image corresponding to the selected grayscale.

According to this configuration, since the projection device and the like can adjust the brightness and the color in grayscale units, the user can more appropriately adjust an image so that the image has the brightness and the color in conformity with the user's preference.

The color difference may include a color difference between green and red and a color difference between blue and yellow.

The combination of green and red and the combination of blue and yellow respectively represent a complementary afterimage relationship. Therefore, when the user adjusts the color of an image while comparing multiple images, the user can intuitively adjust the color of the image utilizing the complementary afterimage relationship, whereby the user can more appropriately adjust the image so that the image has the brightness and the color in conformity with the user's preference.

The image display system may further comprise:

a remote controller used for controlling each of the projection devices, wherein the remote controller may input the operation information to the input section of each of the projection devices based on operation.

According to this configuration, since the user can adjust an image using the remote controller without directly operating each projector, the user can adjust the image in a shorter period of time so that the image has the brightness and the color in conformity with the user's preference.

The invention is described below with reference to the drawings taking the case of applying the invention to a projector as an example. Note that the embodiments described hereunder do not in any way limit the scope of the invention defined by the claims laid out herein. In addition, not all of the elements of the embodiments described below should be taken as essential requirements of the invention.

Image Display System

FIG. 1 is a view showing an image display state according to one embodiment of the invention.

In this embodiment, the user projects an image 30-1 onto a screen 20 using a projector 10-1 and projects an image 30-2 onto the screen 20 using a projector 10-2, as shown in FIG. 1. The user can operate each projector 10 using a remote controller 40. Specifically, an image display system according to this embodiment includes the multiple projectors 10-1 and 10-2 and the remote controller 40. The projector 10 is one type of projection device.

When displaying the images 30-1 and 30-2 side by side or displaying the image 30-2 near the image 30-1, as shown in FIG. 1, the viewer of the images is given a wrong impression if the images 30-1 and 30-2 differ in color and brightness.

In this embodiment, each projector 10 is configured so that the user can adjust the brightness and the colors of the images 30-1 and 30-2 projected from the respective projectors 10 by adjusting the brightness and the color difference.

The functional blocks of the projector 10 having such a function are described below.

Figure 2:
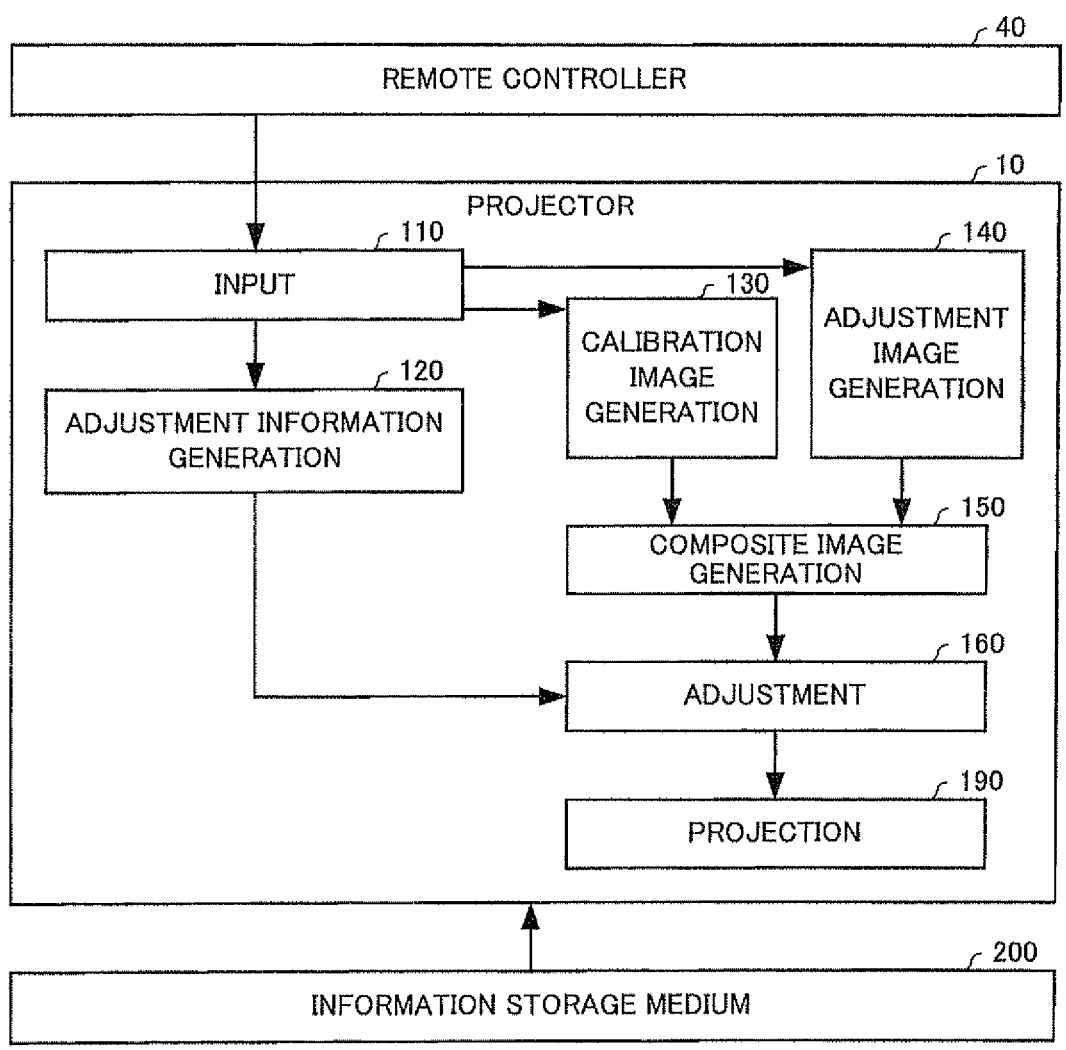
FIG. 2 is a diagram showing functional blocks of a projector according to one embodiment of the invention.

FIG. 2 is a diagram showing the functional blocks of the projector 10 according to one embodiment of the invention.

The projector 10 includes an input section 110 to which operation information and the like are input from the user, an adjustment information generation section 120 which generates brightness adjustment information indicating an adjustment value of the brightness and color difference adjustment information indicating an adjustment value of the color difference based on the operation information, a calibration image generation section 130 which generates multiple calibration images at different grayscales, and an adjustment image generation section 140 which generates an adjustment image for allowing the user to adjust the brightness and the color difference of an image. In this embodiment, the adjustment image is an on-screen display (OSD) image.

The projector 10 also includes a composite image generation section 150 which generates a composite image in which the adjustment image is superimposed on the calibration image, an adjustment section 160 which adjusts the brightness and the color of the image based on the brightness adjustment information and the color difference adjustment information, and a projection section 190 which projects an image adjusted by the adjustment section 160.

As hardware for implementing the above functions of the projector 10, the following hardware may be applied, for example.

As the input section 110, an infrared input port, a RAM, and the like may be applied. As the adjustment information generation section 120, a CPU, a RAM, and the like may be applied. As the calibration image generation section 130 and the adjustment image generation section 140, a ROM, an image processing circuit, and the like may be applied. As the composite image generation section 150, an image processing circuit and the like may be applied. As the adjustment section 160, a RAM, an image processing circuit, and the like may be applied. As the projection section 190, a light source, a liquid crystal panel, a liquid crystal driver, and the like may be applied.

Each section may be partially or entirely implemented by hardware such as a circuit, or implemented by software such as a driver.

The functions of the adjustment information generation section 120 and the like may be implemented by a computer by causing the computer to read a program from an information storage medium 200 which stores a program for causing a computer to function as the adjustment information generation section 120 and the like.

As the information storage medium 200, a CD-ROM, a DVD-ROM, a ROM, a RAM, an HDD, or the like may be applied. The program reading method may be a contact method or a noncontact method.

The above functions may be implemented by downloading a program or the like for implementing the above functions from a host device or the like through a transmission line instead of reading the program from the information storage medium 200.

Flow of Image Adjustment

The flow of an image adjustment process using each section is described below.

Figure 3:
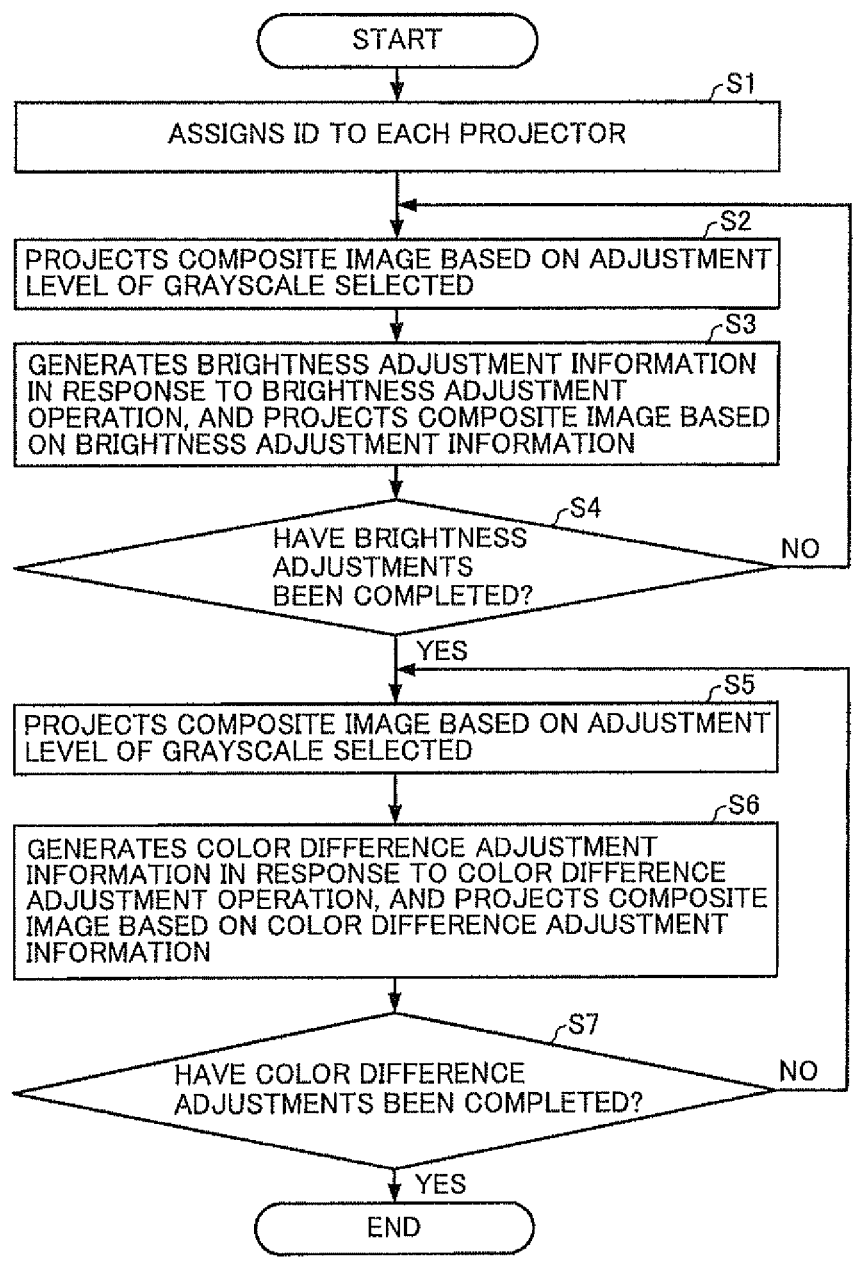
FIG. 3 is a flowchart showing the flow of an image adjustment process according to one embodiment of the invention.

FIG. 3 is a flowchart showing the flow of an image adjustment process according to one embodiment of the invention.

The user assigns an ID to each projector 10 before adjusting an image (step S1). In more detail, the user presses a "Menu" button of an operation panel of the projector 10 or the remote controller 40, for example. The projector 10 projects an image showing a configuration menu in response to the operation of the user. The user selects "Extended"->"Multi-screen"->"Screen ID" from the projected configuration menu by operating the remote controller 40 or the like. The input section 110 outputs the operation information to the adjustment image generation section 140.

The configuration menu is one type of OSD image generated by the adjustment image generation section 140. The configuration menu has a hierarchical structure. When projecting images in parallel (i.e. "Multi-screen"), an item "Image correction" for adjusting the brightness and the color of an image is displayed in addition to the item "Screen ID" for assigning an ID to each projector 10.

The adjustment image generation section 140 generates an adjustment image showing the list of IDs (e.g. integers of 1 to 9) which can be assigned, and the projection section 190 projects an image including the adjustment image.

The user selects an ID by operating up/down keys of the remote controller 40 or the operation panel, and presses a "Set" button. Information indicating the ID determined by the user is stored in the input section 110 and the like.

The user presses the "Menu" button of the remote controller 40 or the operation panel to finish the configuration menu.

The user can operate only the projector 10 to which the ID has been assigned by pointing the remote controller 40 toward a remote controller light receiving section (input section 110) of the operation target projector 10 and pressing a number button indicating the ID (e.g. button 2 when the ID is 2) while pressing the "Numeral" button of the remote controller 40. Specifically, the user can separately operate the multiple projectors 10 using one remote controller 40.

This function may be implemented by causing the input section 110 to determine whether or not the information indicating the ID from the remote controller 40 coincides with the stored ID and switch the projector 10 between an operable state and an inoperable state, for example.

The user can operate all projectors 10 at the same time by pointing the remote controller 40 toward the remote controller light receiving sections of the operation target projectors 10 and pressing the number button indicating 0 while pressing the "Numeral" button of the remote controller 40.

The user installs all projectors 10 in a state in which images can be displayed in parallel, and adjusts the color and the brightness of an image from each projector 10.

The user presses the "Menu" button of the remote controller 40, and selects "Extended"->"Multi-screen"->"Image correction" from the configuration menu projected from the projector 10. The input section 110 outputs the operation information to the calibration image generation section 130 and the adjustment image generation section 140.

The projector 10 projects a composite image based on the adjustment level of the grayscale selected by the user (step S2).

Figure 4:
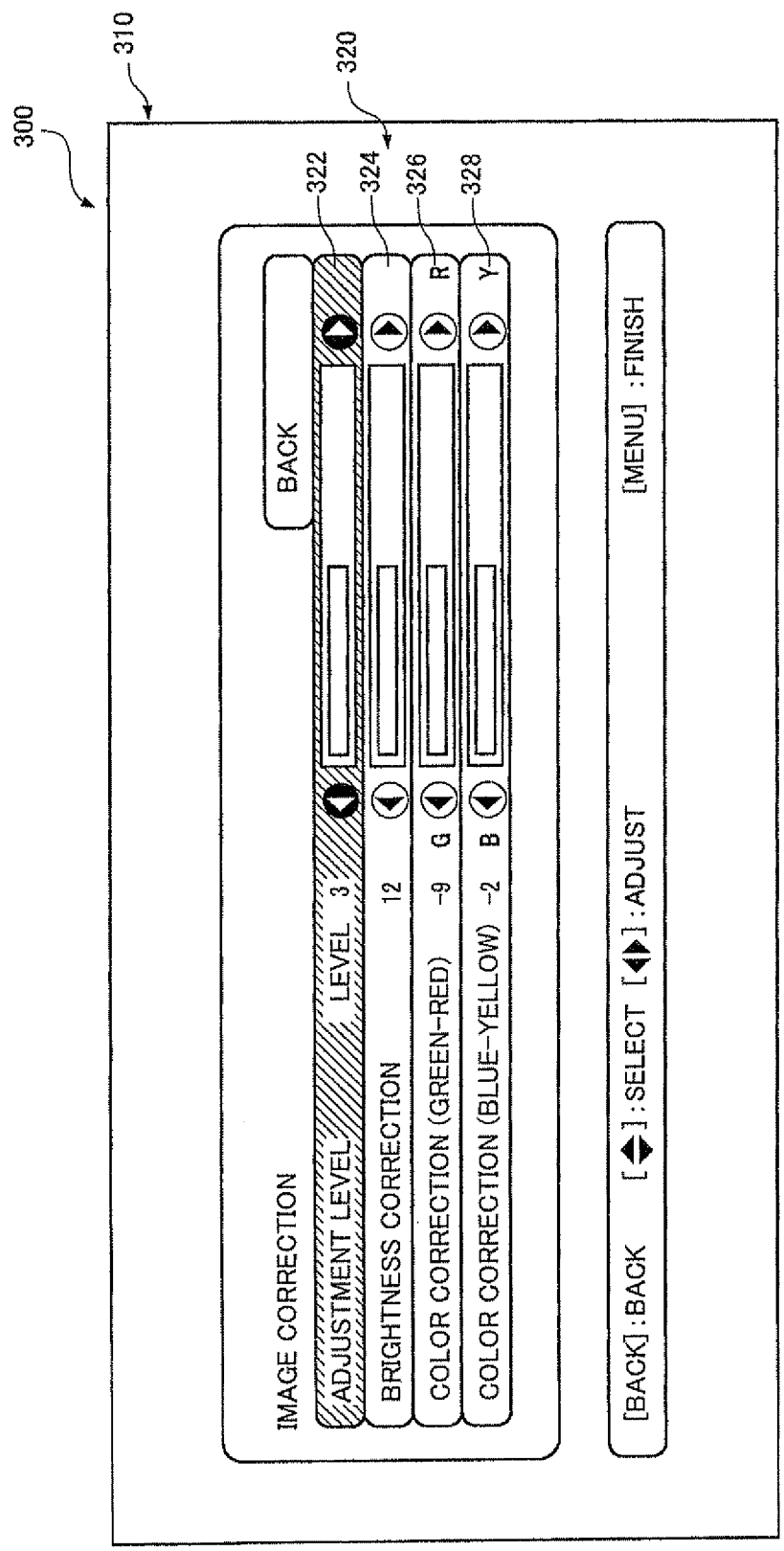
FIG. 4 is a view showing a composite image according to one embodiment of the invention.

FIG. 4 is a view showing a composite image 300 according to one embodiment of the invention.

The composite image 300 includes a calibration image 310 and an adjustment image 320 which is an OSD image.

The user can select a grayscale selection image 322, a brightness adjustment image 324, a color difference adjustment image 326, a color difference adjustment image 328, or "Back" by operating the up/down keys of the remote controller 40. FIG. 4 shows a state in which the grayscale selection image 322 is selected, for example.

The user can select the "Adjustment level" of the grayscale by operating right/left keys of the remote controller 40 in a state in which the grayscale selection image 322 is selected. The "Adjustment levels" include a grayscale 1 (black), a grayscale 2, a grayscale 3, a grayscale 4, and a grayscale 5 (white), for example. The calibration image generation section 130 generates the calibration image 310 of which the grayscale has been changed based on the information indicating a change in the "Adjustment level" from the input section 110. The order of selection of the "Adjustment level" is arbitrary. The calibration image 310 is a image of a single color such as white, black, or gray.

For example, when the user has selected the grayscale 1 (level 1) as the "Adjustment level", the composite image 300 including the calibration image 310 at the grayscale 1 is projected from each projector 10. The user adjusts the brightness while watching each composite image 300.

For example, when the user has selected the level 1 (black), the user adjusts the brightness of each composite image 300 so that each composite image 300 is displayed at the brightness of the brightest composite image 300. When the user has selected the level 5 (white), the user adjusts the brightness of each composite image 300 so that each composite image 300 is displayed at the brightness of the darkest composite image 300. These adjustments are made utilizing the brightness adjustment limits. When the user has selected any of the levels 2 to 4, the user may adjust the brightness based on the composite image 300 having an intermediate brightness. Note that the user compares the calibration images 310 of the composite images 300.

When the user adjusts the brightness, the user selects the brightness adjustment image 324 by operating the up/down keys of the remote controller 40, and adjusts the brightness parameter by operating the right/left keys of the remote controller 40. The adjustment information generation section 120 generates the brightness adjustment information in response to the brightness adjustment operation, the adjustment section 160 adjusts the brightness of the composite image 300 based on the brightness adjustment information, and the projection section 190 projects the composite image 300 of which the brightness has been adjusted (step S3).

The projector 10 repeatedly executes the brightness adjustment process in the steps S2, S3, and the like in grayscale units in response to the operation of the user.

When the brightness adjustments have been completed (step S4), the user adjusts the color of the image.

The user selects the grayscale using the grayscale selection image 322 in a state in which the composite image 300 is projected.

The projector 10 projects the composite image 300 based on the adjustment level of the grayscale selected by the user (step S5). The process in the step S5 is the same as the process in the step S2.

The user compares the reference composite image 300 with another composite image 300, and determines whether the other composite image 300 is greener or redder than the reference composite image 300. When the other composite image 300 is greener than the reference composite image 300, the user selects the color difference adjustment image 326 and presses the right key of the remote controller 40 so that the intensity of red is increased. When the other composite image 300 is redder than the reference composite image 300, the user selects the color difference adjustment image 326 and presses the left key of the remote controller 40 so that the intensity of green is increased. When the user performs the above operation, the projector 10 which projects the other composite image 300 is selected.

The adjustment information generation section 120 generates the color difference adjustment information in response to the above color difference adjustment operation, the adjustment section 160 adjusts the color of the composite image 300 based on the color difference adjustment information, and the projection section 190 projects the composite image 300 of which the color has been adjusted (step S6), The user performs color correction (blue-yellow) in grayscale units after performing color correction (green-red) in grayscale units.

The projector 10 repeatedly executes the color difference adjustment process in the steps S5, S6, and the like in grayscale units in response to the operation of the user until the color difference adjustment process is completed (step S7).

Specific Brightness and Color Adjustment Methods

Specific brightness and color adjustment methods according to this embodiment are described below.

The projector 10 calculates RGB gamma curves based on the values set using the adjustment image 320. The calculation procedure includes 1. converting LUV into RGB and calculating RGB values of five grayscales, 2. complementing four intermediate grayscales, and 3. correcting an overflow or a reverse relationship. This procedure is described below in more detail, FIG. 5 is a table showing adjustment parameters according to one embodiment of the invention.

For example, when there are five "Adjustment levels", 15 adjustment parameters are set in each projector 10 according to the above method.

Parameters L1 to L5 indicating black and white components are set using the brightness adjustment image 324. Parameters V1 to V5 indicating green and red components are set using the color difference adjustment image 326. Parameters U1 to U5 indicating blue and yellow components are set using the color difference adjustment image 328. The parameters L1 to L5 correspond to the brightness adjustment information, and the parameters V1 to V5 and U1 to U5 correspond to the color difference adjustment information.

In the adjustment image 320 according to this embodiment, the grayscale is divided into five levels from the minimum to the maximum. In the projector 10, the grayscale is divided into nine levels from the minimum to the maximum.

The adjustment section 160 calculates RGB values of five grayscales based on the LUV values. The RGB values of nine grayscales are respectively referred to as R0 to R8, G0 to G8, and B0 to B8, and the liquid crystal driver (projection section 190) processes RGB using 10 bits.

In this case, R0=CoefA*L1+CoefB*U1+CoefC*V1,
G0=CoefD*L1+CoefE*U1+CoefF*V1,
B0=CoefG*L1+CoefH*U1+CoefI*V1,
R2=CoefA*L2+CoefB*U2+CoefC*V2+256,
G2=CoefD*L2+CoefE*U2+CoefF*V2+256,
B2=CoefG*L2+CoefH*U2+CoefI*V2+256,
R4=CoefA*L3+CoefB*U3+CoefC*V3+512,
G4=CoefD*L3+CoefE*U3+CoefF*V3+512,
B4=CoefG*L3+CoefH*U3+CoefI*V3+512,
R6=CoefA*L4+CoefB*U4+CoefC*V4+768,
G6=CoefD*L4+CoefE*U4+CoefF*V4+768,
B6=CoefG*L4+CoefH*U4+CoefI*V4+768,
R8=CoefA*L5+CoefB*U5+CoefC*V5+1024,
G8=CoefD*L5+CoefE*U5+CoefF*V5+1024, and
B8=CoefG*L5+CoefH*U5+CoefI*V5+1024.

The constants CoeffA to CoeffI in the above expressions are coefficients of the LUV-RGB color conversion matrix. As the coefficients, CoeffA=3.00, CoeffB=0.75, CoeffC=0.75, CoeffD=3.00, CoeffE=0.25, CoeffF=−1.00, CoeffG=3.00, CoeffH=−1.00, and CoeffI=0.25 may be employed, for example.

The projector 10 can change the color in terms of brightness corresponding to an increase or decrease in the parameter L (parameter of the brightness adjustment image 324), can change the color in terms of blue and yellow corresponding to an increase or decrease in the parameter U (parameter of the color difference adjustment image 328), and can change the color in terms of red and green corresponding to an increase or decrease in the parameter V (parameter of the color difference adjustment image 326) by employing such coefficients.

As the method of complementing R1, R3, R5, R7, and the like, various methods may be employed. For example, when calculating R1 on the black side, the average value of R0 and R2 may be used (method 1), or, when the middle point between R0 and R2 is referred to as R1A and a point which externally divides R2 and R4 at 1:3 on the straight line passing through R2 and R4 is referred to as R1B, a value obtained by weighted averaging R1A and R1B at 2:1 (i.e. R1=(2*R0+5*R2−R4)/6) may be used (method 2). This also applies to G1 and B1 on the black side and R7, G7, and B7 on the white side. For example, R7=(2*R4+5*R6−R8)/6 when using the method 2.

For example, when calculating R3 on the center black side, the average value of R2 and R4 may be used (method 1), or, when the middle point between R2 and R4 is referred to as R3A, a point which externally divides R4 and R6 at 1:3 on the straight line passing through R4 and R6 is referred to as R3B, and a point which externally divides R0 and R2 at 3:1 on the straight line passing through R0 and R2 is referred to as R3C, a value obtained by weighted averaging R1A, R3B, and R3C at 1:1:4 (i.e. R3=(−R0+7*R2+7*R4−R6)/12) may be used (method 3). This also applies to G3 and B3 on the center black side and R5, G5, and B5 on the center white side. For example, R5=(−R2+7*R4+7*R6−R8)/12 when using the method 3.

The adjustment section 160 can calculate R0 to R8, G0 to G8, and B0 to B8 according to the above procedure.

When one of R0 to R8, G0 to G8, and B0 to B8 exceeds the maximum value (1024) or less than the minimum value (0), the adjustment section 160 corrects all RGB values of the grayscale so that the value falls within the specific range (0 to 1024).

When the RGB values are not increased from the grayscale 0 to the grayscale 9 (i.e. reverse relationship), the adjustment section 160 corrects the RGB values so that the values have an appropriate relationship.

The above procedure allows the adjustment section 160 to appropriately calculate R0 to R8, G0 to G8, and B0 to B8, and store the RGB values as a look-up table in which output values at nine points can be respectively set for R, G, and B. The adjustment section 160 can store (correct) the look-up table in real time (i.e. each time the value is changed using the adjustment image 320).

An image of which the brightness and the color have been adjusted is projected by projecting an image based on the look-up table.

According to this embodiment, the projector 10 can adjust the brightness and the color of an image in response to the brightness and color difference adjustment instructions from the user, as described above. This enables the user to appropriately adjust an image in a shorter period of time so that the image has the brightness and the color in conformity with the user's preference. In particular, when the multiple projectors 10-1 and 10-2 project images in parallel, as shown in FIG. 1, the color and the brightness of each image can be made identical, whereby the projectors 10 can project images appropriate for the viewer.

Since the projector 10 projects the adjustment image 320 as an OSD image while superimposing the adjustment image 320 on the calibration image 310, the user can adjust the image using the adjustment image 320 while watching the calibration image 310. This enables the user to appropriately adjust the image in a shorter period of time so that the image has the brightness and the color in conformity with the user's preference.

Since the projector 10 can adjust the brightness and the color in grayscale units, the user can more appropriately adjust an image so that the image has the brightness and the color in conformity with the user's preference. Since the projector 10 allows the user to adjust an image for some grayscales instead of all necessary grayscales, and complements the omitted grayscales, the user can adjust an image in a shorter period of time.

The color difference set using the adjustment image 320 is the combination of green and red and the combination of blue and yellow. The combinations of these colors respectively represent a complementary afterimage relationship. Therefore, when the user adjusts the color of an image while comparing multiple images, the user can intuitively adjust the color of the image utilizing the complementary afterimage relationship, whereby the user can more appropriately adjust the image so that the image has the brightness and the color in conformity with the user's preference.

According to this embodiment, since the user can adjust an image using the remote controller 40 without directly operating each projector 10, the user can adjust the image in a shorter period of time so that the image has the brightness and the color in conformity with the user's preference.

The invention is not limited to the above embodiments. Various modifications and variations may be made.

For example, the above embodiment uses two projectors 10-1 and 10-2. Note that three or more projectors 10 may be used. The invention is also effective when adjusting the color and the brightness of an image using one projector 10.

The projector 10 may selectively project the composite image 300 and a normal image in response to an image switching operation of the user. For example, when image switching operation instruction information has been input to the input section 110 from the remote controller 40, the adjustment section 160 may select an image signal for a normal image instead of an image signal for the composite image 300.

According to this modification, since the user can adjust the brightness and the like of an image while checking the display state of a normal image used during presentation or the like, the user can more appropriately adjust the image to an image in conformity with the user's preference.

Instruction information input by operating the button of the operation panel of the projector 10 may be input to the input section 110 instead of the operation information input using the remote controller 40, and the adjustment information is generation section 120 may generate the brightness adjustment information and the like based on the instruction information.

When the projector 10 includes a liquid crystal screen in the main body, the projector 10 may display the adjustment image 320 on the liquid crystal screen while projecting the calibration image 310.

The function of the calibration image 310 may be included in the adjustment image 320, and the projector 10 may allow the user to adjust an image by projecting only the adjustment image 320 instead of the composite image 300.

The projection device to which the invention can be applied is not limited to the projector 10, but may be a projection TV or the like. The projector is not limited to the front projection type projector 10, but may be a rear projection type projector. The projector is not limited to a liquid crystal projector, and may be a DLP projector, a CRT projector, an LED projector, or the like.

Although only some embodiments of the invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A projector comprising:
   an adjustment image generation section which generates an adjustment image which allows adjustments of brightness and color difference;
   an input section to which first operation information indicating a brightness adjustment operation and to which second operation information indicating a color difference adjustment operation are input;
   an adjustment information generation section which generates brightness adjustment information indicating an adjustment value of the brightness based on the first operation information, and generates color difference adjustment information indicating an adjustment value of the color difference based on the second operation information; and
   an adjustment section which (i) adjusts a look-up table to convert RGB values of color image data into output RGB values as output values by performing a predetermined calculation based on LUV values that express the brightness adjustment information and that express the color difference adjustment information, and a color conversion matrix to convert LUV values into RGB values, (ii) adjusts the brightness of an image based on the brightness adjustment information and the look-up table, and (iii) adjusts the color of the image based on the color difference adjustment information and the look-up table in the state that the brightness adjustment has been completed.

2. The projector as defined in claim 1, further comprising:
   a projection section which projects a composite image obtained by superimposing the adjustment image on a calibration image,
   wherein the projection section projects the composite image adjusted by the adjustment section when the adjustment section has made adjustments.

3. The projector as defined in claim 2, further comprising:
   a calibration image generation section which generates a plurality of calibration images having different grayscales,
   wherein the adjustment image generation section generates an image which allows selection of the grayscales of the calibration images as part of the adjustment image;
   wherein the input section inputs information of the selected grayscales;
   wherein the calibration image generation section generates the calibration images corresponding to the selected grayscales based on the information of the selected grayscales; and
   wherein the projector projects composite images obtained by superimposing the adjustment image and the calibration images corresponding to the selected grayscales.

4. The projector as defined in claim 1,
   wherein the color difference includes a color difference between green and red and a color difference between blue and yellow.

5. An image display system projecting images in parallel by using a plurality of the projectors as defined in claim 1.

6. The image display system as defined in claim 5, further comprising:
   a remote controller used for controlling each of the projectors,
   wherein the remote controller inputs the operation information to the input section of each of the projectors based on operation.

7. An image processing method comprising:
   causing a projector to:
      receive first operation information indicating a brightness adjustment operation,
      generate brightness adjustment information indicating an adjustment value of the brightness based on the first operation information,
      receive second operation information indicating a color difference adjustment operation,
      generate color difference adjustment information indicating an adjustment value of the color difference based on the second operation information, and
      (i) adjust a look-up table to convert RGB values of color image data into output RGB values as output values by performing a predetermined calculation based on LUV values that express the brightness adjustment information and that express the color difference adjustment information, and a color conversion matrix to convert LUV values into RGB values, (ii) adjust the brightness of an image based on the brightness adjustment information and the look-up table, and (iii) adjust the color of the image based on the color difference adjustment information and the look-up table in the state that the brightness adjustment has been completed.

* * * * *